Feb. 16, 1937.  B. SASSEN  2,070,811

THERMALLY CONDITIONED MACHINE TOOL

Filed July 28, 1934 2 Sheets-Sheet 1

Inventor
BERNARD SASSEN

By A. H. Parsons
Attorney

Feb. 16, 1937. B. SASSEN 2,070,811
THERMALLY CONDITIONED MACHINE TOOL
Filed July 28, 1934  2 Sheets-Sheet 2

Inventor
BERNARD SASSEN
By A. K. Parsons
Attorney

Patented Feb. 16, 1937

2,070,811

UNITED STATES PATENT OFFICE 2,070,811

THERMALLY CONDITIONED MACHINE TOOL

Bernard Sassen, Cincinnati, Ohio, assignor to The Cincinnati Milling Machine Company, Cincinnati, Ohio, a corporation of Ohio Application July 28, 1934, Seral No. 737,468

8 Claims. (Cl. 90—11)

This invention relates to metal working machines, and more particularly to improvements in an hydraulically operated machine tool.

One of the objects of this invention is to improve the accuracy of hydraulically operated machine tools by controlling the thermal condition thereof.

Another object of this invention is to provide a machine tool which will have a substantially constant temperature under all operating conditions, thereby preventing inaccuracies caused by uneven expansion and contraction of various parts which were previously due to heating up of the machine.

Another object of this invention is to provide a fluid operated machine tool in which the fluid is of substantially constant viscosity throughout any given period of operation of the machine.

A still further object of this invention is to eliminate all compensating devices on hydraulically operated machine tools, and provide a single automatic control means for maintaining the machine and operating parts at a constant temperature.

An additional object of this invention is to provide a fluid operable delayed trip controlled mechanism in which the timing of the delay will always be the same for any given adjustment thereof.

A still further object of this invention is to provide a remote control fluid operable mechanism for determining the position of a part which will insure that the position of the part will always be the same for any given setting of the control.

Other objects and advantages of the present invention should be readily apparent by reference to the following specification, considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 1:
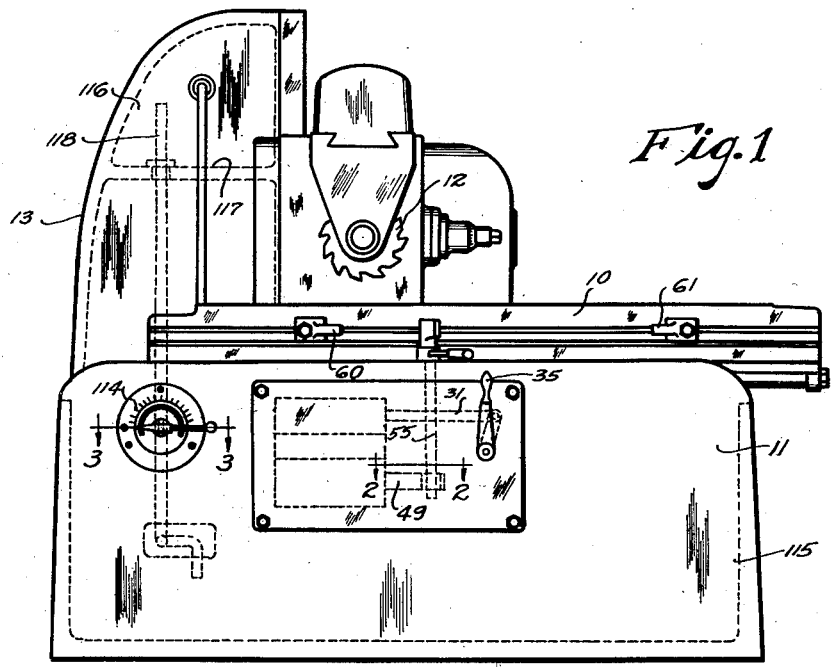
Figure 1 is an elevation of a machine tool embodying the principles of this invention.
Figure 4:
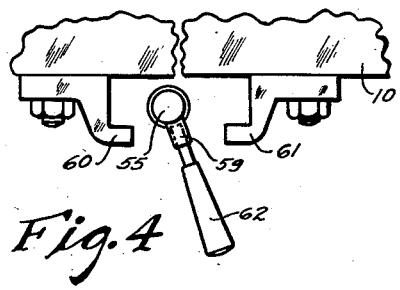
Figure 4 is a detailed plan view of the trip control mechanism.

In the quest for greater accuracy in machine tools, the detrimental effects of heat have been known but prior attempts to offset these effects have been confined to compensating devices applied locally at presumed strategic points, but no attempt has been made to prevent temperature changes in the first instance, thereby eliminating the trouble at its source. This invention is directed to improving the accuracy of machine tools by thermally conditioning the same, and a milling machine such as shown in Figure 1 has been selected to exemplify this invention.

In this type of machine tool, as in many other types, stock removal is accomplished by effecting relative movement between a tool and work piece. This is accomplished in the machine shown by applying the work piece to the table 10 which is reciprocably mounted in guideways formed on the top of the bed 11 and moving the table past the tool 12 which is rotatably supported by the column 13 and power driven through suitable conventional means not shown, from a power shaft 14 which, as shown in Figure 5, is actuated by a prime mover 15.

Figure 5:
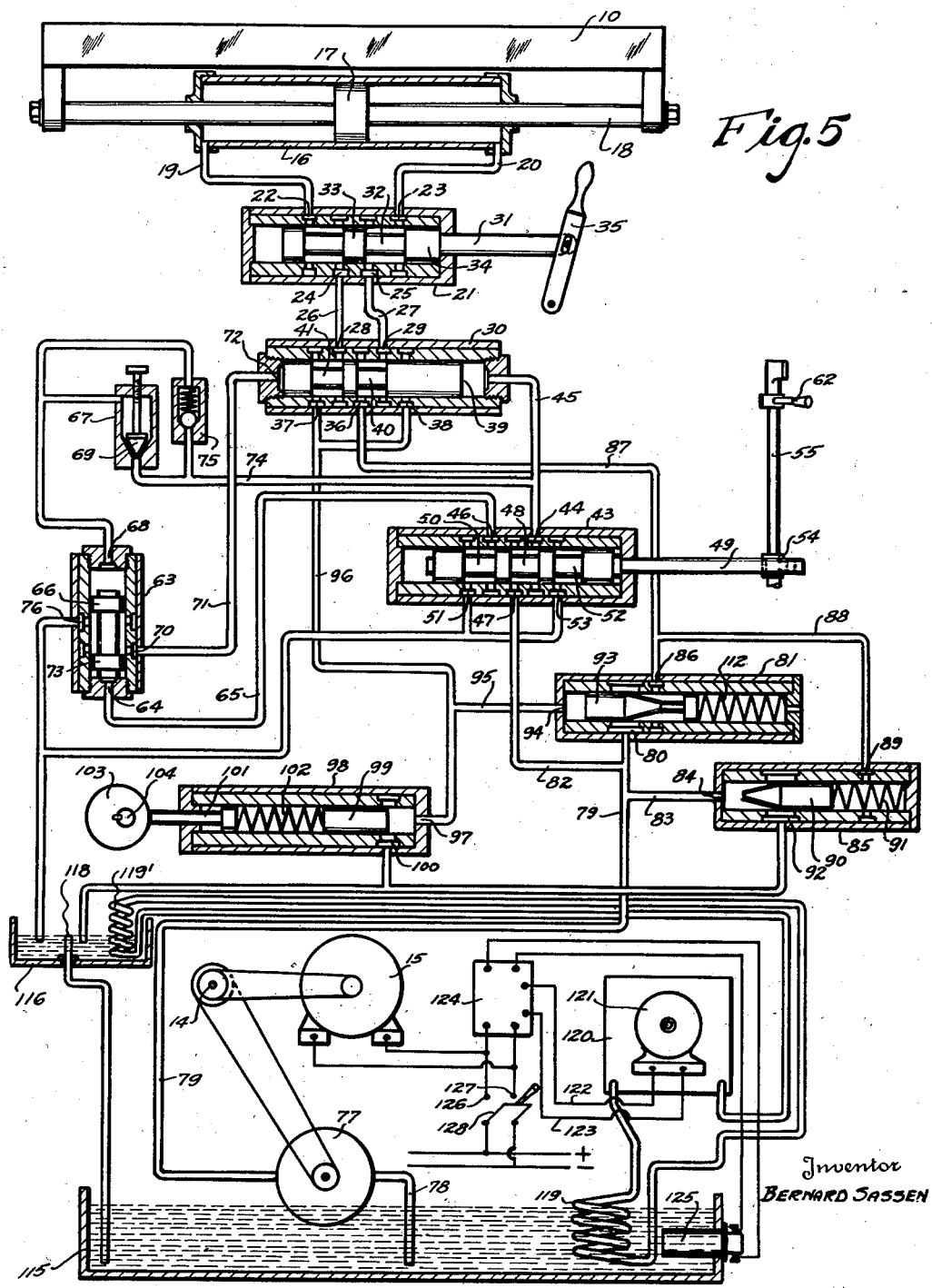
Figure 5 is a semi-diagrammatic view of the fluid control circuit of the machine.

As shown in Figure 5, the table may be moved by a fluid operable motor in the form of a cylinder 16 having a contained piston 17 which is operatively connected by a piston rod 18 to opposite ends of the table 10. A pair of channels 19 and 20 are connected respectively to opposite ends of the cylinder and it will be apparent that when pressure fluid is delivered by one of these channels to the cylinder and the other channel connected to exhaust, that the table will be moved. In prior devices of this nature, the fluid delivered to the cylinder gradually becomes heated when the machine is operating under a heavy production schedule due to the wire-drawing effect of throttles and relief valves and the forcing of large quantities of fluid at high velocities through the piping. As the temperature of the oil rises, the piston rod 18 necessarily becomes heated, with the result that the same expands and due to unequal expansion thereof relative to the table 10, a tendency is created for the table to buckle slightly which means that work surfaces displaced from the center of the table will have more material removed therefrom than work surfaces located in approximately the center of the table. By means of the present invention, the fluid delivered to the cylinder 16 is maintained at a substantially constant temperature, thereby eliminating these undesirable effects.

Movement of the table may be started or stopped by a stop valve 21 having ports 22 and 23 to which channels 19 and 20 are respectively connected. This valve also has ports 24 and 25 which are connected by channels 26 and 27 to ports 28 and 29 respectively of a reversing valve 30. The reversing valve alternately admits pressure fluid to channels 26 and 27 to cause reciprocation of the table. The plunger 31 of the stop valve has a cannelure 32 which is flanked by spools 33 and 34 so that upon movement of the plunger 31 to the left as viewed in Figure 5 by the operatively connected control lever 35, the ports 24 and 25 are interconnected by the cannelure and the spools 33 and 34 close ports 22 and 23. This prevents escape of fluid from the cylinder 16 but permits the incoming flow through either channel 26 or 27 to be by-passed to reservoir, thereby preventing undue load on the pump and the creation of excessive high pressures in the system.

The reversing valve 30 has a pressure port 36 and a pair of return ports 37 and 38. This valve has a plunger 39 in which is formed a first cannelure 40 for alternately connecting port 29 to the pressure port 36 or exhaust port 38; a second cannelure 41 for interconnecting port 28 to return port 37 when the plunger is to the left; and with pressure port 36 when the plunger is toward the right.

Figure 2:
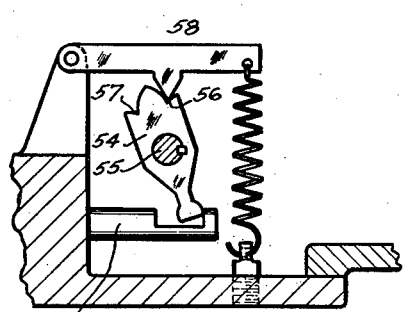
Figure 2 is a detailed section on the line 2—2 of Figure 1.

The position of the reversing valve plunger is controlled by a pilot circuit including a pilot valve 43 having a port 44 connected by channel 45 to the right hand end of the reversing valve housing, and a second port 46 for supplying fluid to the left end of the reversing valve. The pilot valve has a pressure port 47 which is alternately connected by the cannelure 48 in the valve plunger with ports 44 and 46 to effect shifting of the reversing valve plunger by power. The valve plunger 49 also has a cannelure 50 for connecting port 46 with a return port 51 when the plunger is toward the right, and a second cannelure 52 for connecting port 44 with a return port 53 when the plunger is shifted to the left. The plunger 49 is extended and operatively connected through suitable means such as a ball-ended lever 54 with a trip controlled shifter rod 55. This rod extends upward to a position adjacent the edge of the work table. As shown in Figure 2 the ball-ended lever 54 has a lost motion connection with the valve plunger 49 and also has a pair of indents 56 and 57 which are alternately engaged by the spring pressed detent 58. This constitutes a load and fire mechanism which insures complete shifting of the pilot valve.

The rod 55 has a lug 59 projecting radially from the side thereof opposite to the table, which is alternately engageable by dogs 60 and 61 for automatically changing the direction of movement of the table. The rod also has integrally secured thereto the manually operable handle 62 whereby the direction of movement of the table may be changed at will by the operator.

In machine tools of the nature disclosed, it is often desirable that a slight delay occur between the time of tripping the reversing mechanism and the actual start of the table in its new direction. This delay is to permit the tool to clean up before retracting from the work. One form of delay mechanism is shown herein and comprises a valve 63 having a port 64 in one end thereof which is connected by channel 65 to the port 46 of the pilot valve. When pressure is admitted to channel 65 to shift the reversing valve plunger to the left, the fluid entering port 64 acts on the end of valve plunger 66 to shift the same axially, but the fluid in the opposite end of valve 63 is prevented from escaping at a fast rate by a throttle valve 67 which is interposed between a port 68 of valve 63 and port 44 of the pilot valve. The throttle valve 67 has an adjustable plunger 69 which determines the rate of escape of fluid from the upper end of valve 63 and thereby the timing of the delay. This is true because port 64 cannot be connected to port 70 and thereby through channel 71 to port 72 of the reversing valve until the plunger 66 has moved upward a sufficient amount for the spool 73 thereof to uncover port 70. In prior devices of this nature utilizing a throttle valve, the viscosity of the fluid plays an important part because if the fluid was very cold and thick, the time of delay for a given setting of the throttle valve was considerably longer than when the fluid was hot and limpid. This meant that the tool in some cases had more than enough time to clean up the cut and in other cases not enough time. It will thus be seen that the results vary even although the throttle valve had the same setting. By means of the present invention the temperature of the fluid is maintained sufficiently constant that the viscosity of the fluid does not vary sufficiently to produce any marked change in the time of delay for a given setting of the throttle valve.

When the pilot valve is tripped to the position shown in Figure 5, the plunger 66 is in an extreme upward position, and the pressure from port 44 flows through channel 45 to immediately shift plunger 39 and at the same time it flows through channel 74 to the throttle valve, but since the valve is closed to such an amount as to prevent a rapid flow to valve 63, a by-pass check valve 75 is provided in parallel with the throttle valve so that the fluid will be immediately by-passed around the throttle valve and immediately effect downward shifting of plunger 66. Upon completion of this downward movement, the plunger 66 will interconnect port 70 with return port 76 thereby permitting free exhaust of fluid from port 72 and an immediate shifting of the reversing valve.

Pressure fluid is supplied to the system by a pump 77 which is driven from the shaft 14 which in turn is actuated by the prime mover 15. The pump has an intake 78 for withdrawing fluid from a reservoir and delivering the same under pressure to channel 79 which channel is connected to port 80 of a rate control valve 81. A channel 79 has a branch 82 which supplies fluid pressure to port 47 of the pilot valve. It also has a second branch 83 which is connected to port 84 of a differential valve 85. The rate control valve 81 has a port 86 which is connected by channel 87 for delivering fluid to pressure port 36 of the reversing valve. Channel 87 has a branch 88 connected to port 89 of the differential valve 85. From the foregoing, it will be seen that the pressure in channel 79 acts on the left end of plunger 90 which is reciprocably mounted in valve 85 and the opposite end of the plunger is acted upon by the pressure in channel 87. Except when the throttle valve 81 is wide open and even then to a slight extent, there is a pressure drop across the throttle valve which means that the pressure acting in the left end of plunger 90 is always greater than the pressure acting upon the opposite end. A spring 91 is inserted in the valve 85 and the pressure of the spring plus the pressure in channel 88 is always equal to the pressure in channel 79 and should the pressure become unbalanced so that the pressure in channel 79 is greater, the plunger 90 will move toward the right and uncover port 92 permitting escape of a certain amount of fluid to equalize the pressures. The differential valve 85 thus acts to maintain a constant pressure differential across the throttle valve regardless of the load conditions on the table and regardless of the rate of table movement. The throttle valve has a plunger 93 which is movable with respect to port 80 to open and close the same and thereby determine the feed rate of the machine, which feed rate will be constant for a given setting of the plunger 93 because the differential valve 85 automatically takes care of the load conditions.

Figure 3:
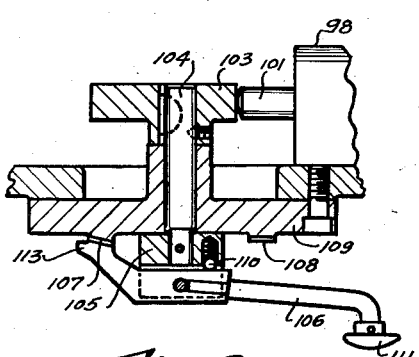
Figure 3 is a section on the line 3—3 of Figure 1.

The valve 81 has a port 94 which is connected by a branch line 95 to the return line 96 from the reversing valve. Channel 96 is connected to port 97 of the feed rate control valve 98. This valve has a plunger 99 mounted therein for controlling the rate of escape of fluid from channel 96 to the return port 100 and thereby determining the pressure in channel 96 which in turn determines the pressure on the left end of plunger 93 of throttle valve 81. A second plunger 101 is reciprocably mounted in valve 98 and a spring 102 is interposed between plunger 101 and plunger 99. The plunger 101 is held in contact by the spring 102 with the periphery of a rotatable cam 103. The cam is keyed to the end of shaft 104 which shaft, as shown in Figure 3, projects through the front wall of the machine for receiving a bifurcated collar 105. A manually operable control lever 106 is pivotally mounted between the bifurcations of the collar. One end of the lever has a V-shaped end 107 adapted to selectively engage similarly formed teeth 108 formed on the face of a supporting plate 109. A spring pressed ball 110 serves to normally maintain the V-shaped end of the lever in engagement with the teeth and thereby hold the cam 103 in its various adjusted positions. By depressing the knob 111, the operator can rotate the cam and thereby variously position the plunger 99 relative to the port 100 to determine the pressure acting on the left end of plunger 93. A spring 112 continuously acts on the right end of plunger 93 and thereby against the fluid pressure acting to shift the plunger. Since the plunger 99 acts as a throttle valve, the pressure in channel 96 will depend for a given position of plunger 99 upon the viscosity of the fluid, but in the present instance means have been provided for maintaining the temperature of the fluid substantially constant whereby its viscosity will be substantially constant and the feed rate indicated by the pointer 113 moving over the scale 114 will be the true feed rate.

The means for thermally conditioning the machine will now be explained. The main reservoir 115 is formed by the structural walls of the bed 11 so that the fluid therein is in direct contact with the walls. This means that if the temperature of the fluid is maintained substantially constant, the temperature of the walls will also be maintained substantially constant, thereby preventing expansion or contraction thereof.

The machine is also provided with an auxiliary reservoir 116 which is formed in the upper part of the column 13 by casting a horizontal wall 117 in the column integral with the side walls thereof. The fluid in this reservoir is also in direct contact with the side walls of the column as well as the wall 117 which in reality forms the floor of the auxiliary reservoir. As shown in Figure 5, this auxiliary reservoir may be interposed in the return lines so that the returning fluid will collect in this reservoir to a predetermined height as determined by the height of the over-flow pipe 118 above the floor 117. This pipe returns the overflow to the main reservoir. If the fluid in reservoir 116 is now maintained substantially constant and nearly equal to the temperature of the fluid in reservoir 115, it will be seen that the walls of the column will be substantially the same temperature as the walls of the bed and no unequal expansions between the two will occur to throw the tool out of alignment with the work.

The temperature and thereby the viscosity of the operating fluid in these reservoirs is maintained substantially constant by cooling coils 119 and 119' which are serially connected to any well-known form of compressor unit 120 which circulates a cooling medium through the coils. The compressor may be actuated by an electric motor 121, the motor having a pair of leads 122 and 123 connected to any conventional form of thermostatically controlled switch mounted in the switch box 124. The switch in box 124 is controlled by a thermostat 125 which is located in the reservoir 115 so that the compressor will be automatically actuated by the motor 121 whenever the temperature of the fluid varies from a predetermined standard to which the thermostat is adjusted.

The prime mover 15 and the switch box 124 may be connected in parallel to switch points 126 and 127 for joint control by the main switch 128. Thus the operation of the whole machine may be controlled from a single main switch.

It will now be seen that with the operating fluid and the air in the chambers closely associated therewith maintained at a constant temperature, and these in turn assisting to maintain the temperature of the structural walls of the machine constant by contact therewith, that the relative relation between the tool and work will be constant throughout any period of operation of the machine; and since the viscosity of the fluid will be constant because its temperature is constant, the feed rate of the machine will be the same throughout any period of operation.

There has therefore been provided an hydraulically operated machine tool that has improved accuracy in the sense of maintaining the relative position between tool and work during any period of machine operation; that has means for maintaining any selected feed rate regardless of work done and that has accurate respondence at all times between controls and the parts controlled.

What is claimed is:

1. In a fluid operable metal working machine having a tool spindle and a work support, the combination of fluid operable means for effecting relative movement between the supports, a fluid reservoir, pumping means for delivering fluid from the reservoir under pressure to said fluid operable means, power operable mechanism for maintaining the temperature of the fluid in said reservoir substantially constant, additional power operable means for driving said spindle and pumping means, and a common control for both of said power operable means.

2. In a fluid operable metal working machine having a tool spindle and a work support, the combination of fluid operable means for effecting relative movement between the supports, a fluid reservoir, pumping means for delivering fluid from the reservoir under pressure to said fluid operable means, power operable mechanism for maintaining the temperature of the fluid in said reservoir constant, additional power operable means for driving said spindle and pumping means, a common control for both of said power operable means, and an auxiliary control for determining operation of one of said power operable means independently of the other.

3. In a machine tool structure having a chamber formed in part by structural walls which support one of the movable elements of the machine, the combination of a fluid reservoir formed in said chamber with the fluid in direct contact with said walls, means to utilize the fluid in said reservoir for actuation of a movable element of the machine, and means to maintain the walls of said chamber and the fluid in said reservoir at a substantially even temperature to prevent expansion of the walls and to maintain the rate of operation of the movable element constant, including a cooling coil mounted in said reservoir and power operable means for circulating a cooling medium through said coil.

4. In a machine tool having a fluid operable part, the combination of a reservoir containing a body of operating fluid, means for supplying said operating fluid to said part, means for cooling said fluid, and means in the body of the fluid and responsive to rises in the temperature thereof to effect operation of said cooling means and thereby inverse changes in the temperature of the fluid whereby the viscosity of the fluid may remain substantially constant.

5. In a machine tool having a work support and a tool support, the combination with a fluid operable motor for effecting a relative feeding movement between the supports, of a reversing mechanism for changing the direction of said relative movement including a fluid shiftable device, means to supply an operating fluid for shifting said device, means to delay the flow of said operating fluid to said device including a throttle valve positionable to determine time of said delay, and means to maintain the viscosity of the fluid passing through said throttle valve substantially constant whereby the time of delay will always be the same for a given setting of the valve.

6. A thermally conditioned machine tool comprising structural walls for supporting and guiding a work table for relative movement with respect to a metal removing tool, an hydraulic circuit for actuating said table including an hydraulic motor, throttle means for controlling the rate of fluid delivered to and from said motor and thereby its rate of operation, a fluid reservoir formed by said walls, means for pumping fluid from said reservoir into said circuit and means in the reservoir for maintaining the fluid contained therein at a substantially constant temperature, whereby a given setting of said throttling means will produce a substantially constant rate of table movement.

7. A thermally conditioned machine tool comprising structural walls for supporting and guiding a work support and a metal removing tool for relative movement, means for effecting said movement including an hydraulic operating circuit consisting of a fluid operable motor operatively connected for effecting said movement, a throttling device for governing the rate of fluid consumption of said motor, and means for supplying said throttling device with fluid at constant temperature including a reservoir formed in part of said walls, a thermostatically controlled cooling system for maintaining the body of fluid in said reservoir at a constant temperature, a power operable means for withdrawing fluid from said reservoir and delivering the same to said throttling device whereby for a given setting of said device the resultant rate of said relative movement will remain substantially constant.

8. In a machine tool having a work support and a tool support, the combination with a fluid operable circuit for effecting relative movement between said supports including a reversing valve, of a pilot control circuit for shifting said valve including a fluid operable delayed trip mechanism, and means for supplying fluid at a constant temperature to said delayed trip mechanism whereby the delay effected thereby will be substantially constant including a reservoir of fluid, thermostatically controlled means for maintaining the temperature of said fluid constant, and power operable means for delivering said fluid to said delay trip mechanism.

BERNARD SASSEN.